United States Patent [19]
Matthews, III

[11] Patent Number: 5,600,368
[45] Date of Patent: Feb. 4, 1997

[54] INTERACTIVE TELEVISION SYSTEM AND METHOD FOR VIEWER CONTROL OF MULTIPLE CAMERA VIEWPOINTS IN BROADCAST PROGRAMMING

[75] Inventor: Joseph H. Matthews, III, Redmond, Wash.

[73] Assignee: Microsoft Corporation, Redmond, Wash.

[21] Appl. No.: 336,804

[22] Filed: Nov. 9, 1994

[51] Int. Cl.⁶ .............................. H04N 7/18; H04N 5/232
[52] U.S. Cl. ........................ 348/143; 348/211; 348/159
[58] Field of Search ................................. 348/143, 144, 348/157, 159, 7, 13, 211, 148, 149, 150, 151, 156

[56] References Cited

U.S. PATENT DOCUMENTS

| 4,081,754 | 3/1978 | Jackson | 325/396 |
|---|---|---|---|
| 4,203,130 | 5/1980 | Doumit et al. | 358/1 |
| 4,228,543 | 10/1980 | Jackson | 358/191.1 |
| 4,694,490 | 9/1987 | Harvey et al. | 380/20 |
| 4,704,725 | 11/1987 | Harvey et al. | 380/9 |
| 4,706,121 | 11/1987 | Young | 358/142 |
| 4,751,578 | 6/1988 | Reiter et al. | 358/183 |
| 4,908,713 | 3/1990 | Levine | 358/335 |
| 4,977,455 | 12/1990 | Young | 358/84 |
| 4,992,866 | 2/1991 | Morgan | 348/159 |
| 5,038,211 | 8/1991 | Hallenbeck | 358/142 |
| 5,068,733 | 11/1991 | Bennett | 348/7 |
| 5,068,734 | 11/1991 | Beery | 358/191.1 |
| 5,151,789 | 9/1992 | Young | 358/194.1 |
| 5,182,641 | 1/1993 | Diner et al. | 348/159 |
| 5,206,732 | 4/1993 | Hudson | 348/159 |
| 5,233,654 | 8/1993 | Harvey | 380/20 |
| 5,307,173 | 4/1994 | Yuen et al. | 358/335 |
| 5,335,079 | 8/1994 | Yuen et al. | 358/335 |
| 5,335,277 | 8/1994 | Harvey et al. | 380/20 |
| 5,353,121 | 10/1994 | Young et al. | 348/563 |
| 5,448,291 | 9/1995 | Wickline | 348/159 |
| 5,479,266 | 12/1995 | Young et al. | 358/335 |
| 5,479,268 | 12/1995 | Young et al. | 358/335 |
| 5,488,427 | 1/1996 | Kayashima et al. | 348/734 |
| B1 4,706,121 | 12/1993 | Young | 358/142 |

Primary Examiner—Amelia Au
Attorney, Agent, or Firm—Lee & Hayes, PLLC

[57] ABSTRACT

An interactive television system has a set-top box adapted for use with a television and a remote control handset. The set-top box is connected to receive a television broadcast that is filmed using multiple cameras situated at various camera viewpoints. The television broadcast has a primary channel, with which the viewer is familiar as carrying the desired television program, and multiple virtual channels associated with the primary channel. The virtual channels carry video signals from the multiple different cameras covering the event. The remote control handset has dedicated camera control buttons for selecting corresponding virtual channels to allow the viewer to choose a desired camera viewpoint. The dedicated camera control buttons are arranged in an intuitive pattern that correlates to the camera viewpoints.

14 Claims, 7 Drawing Sheets

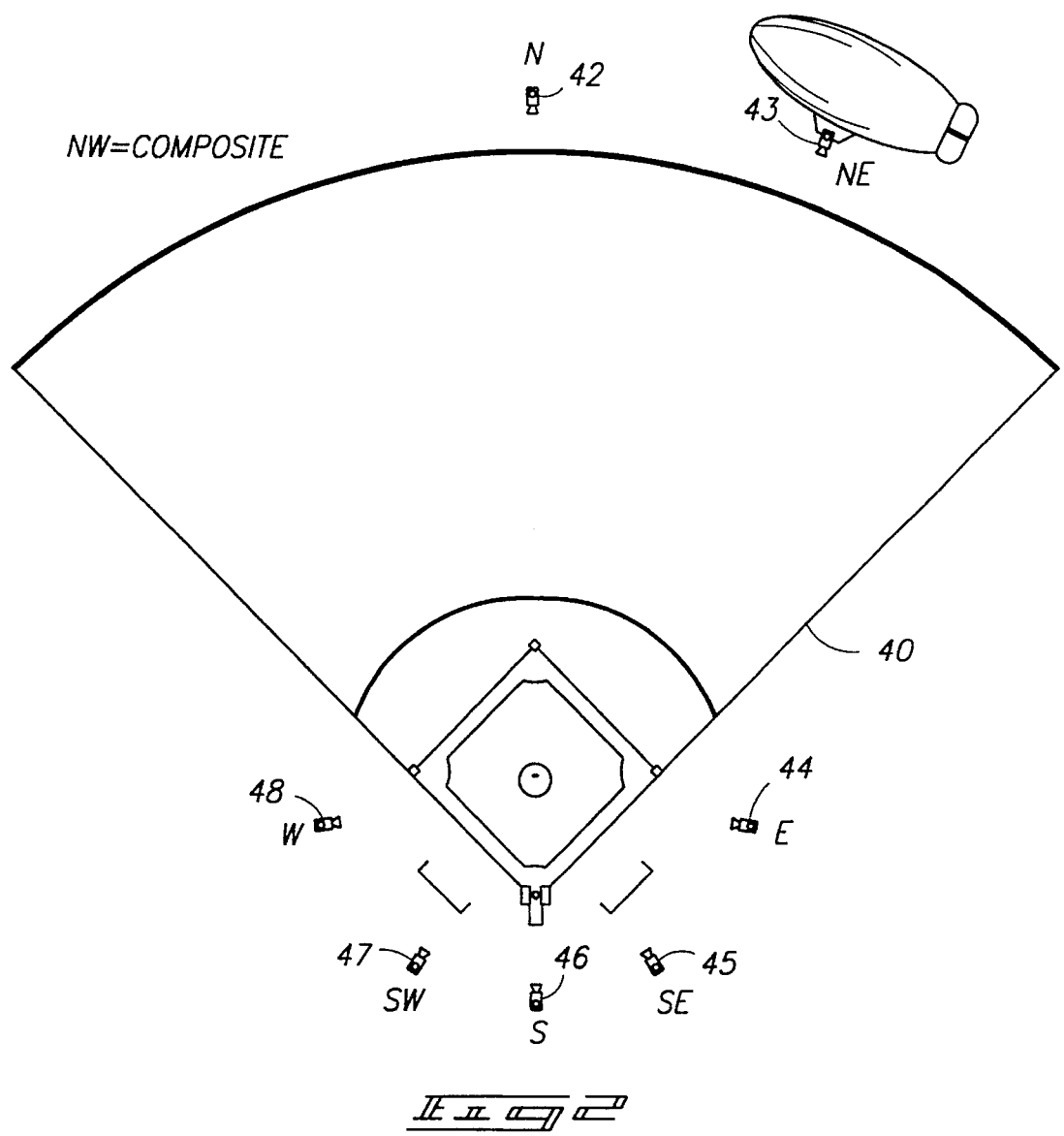
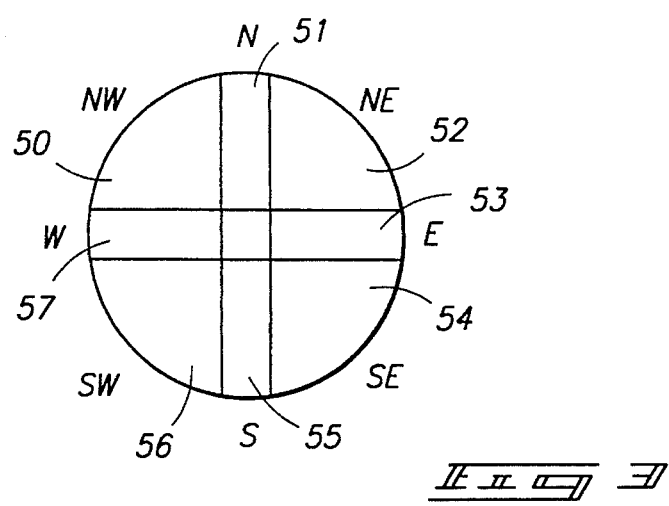

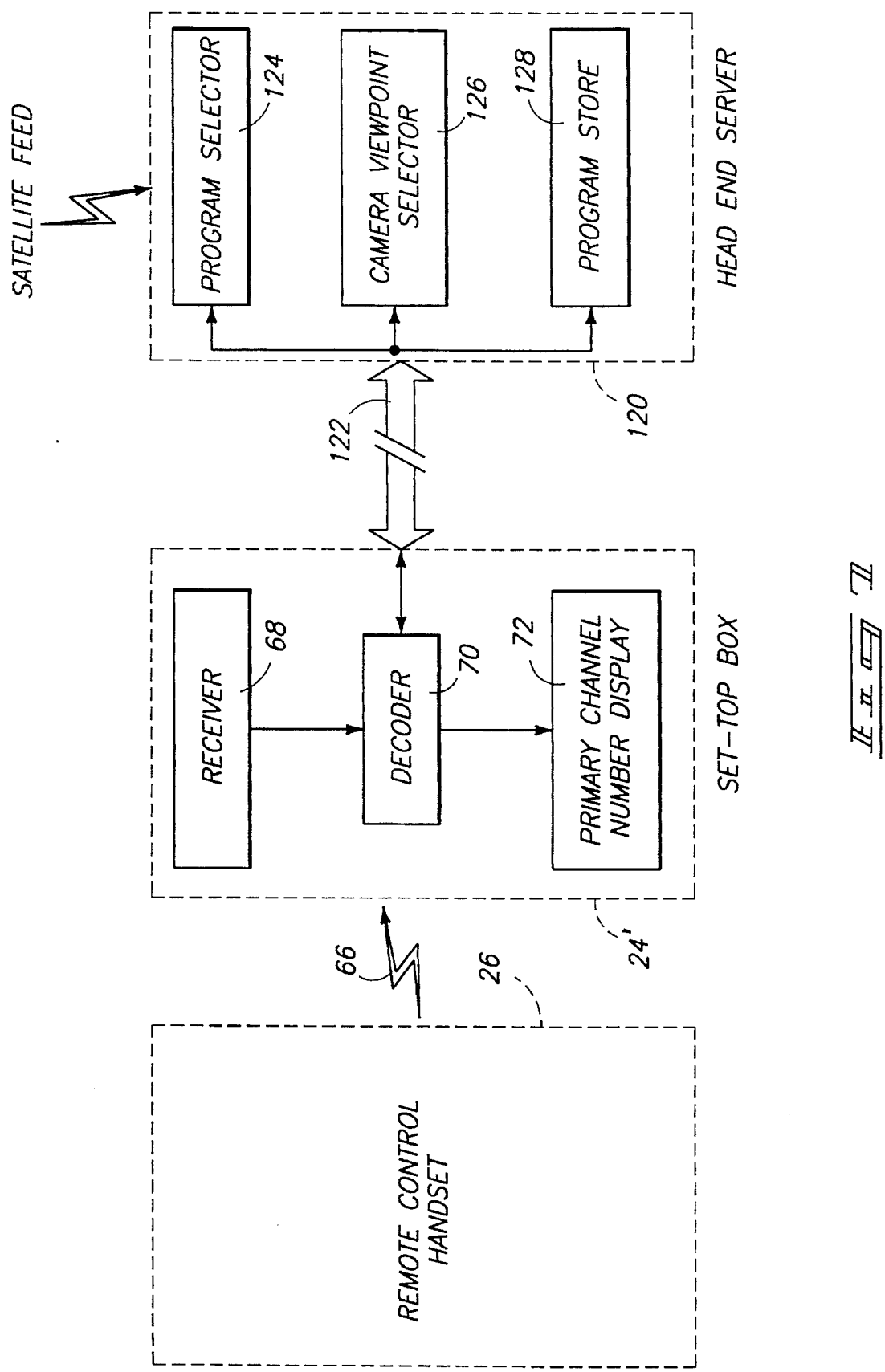

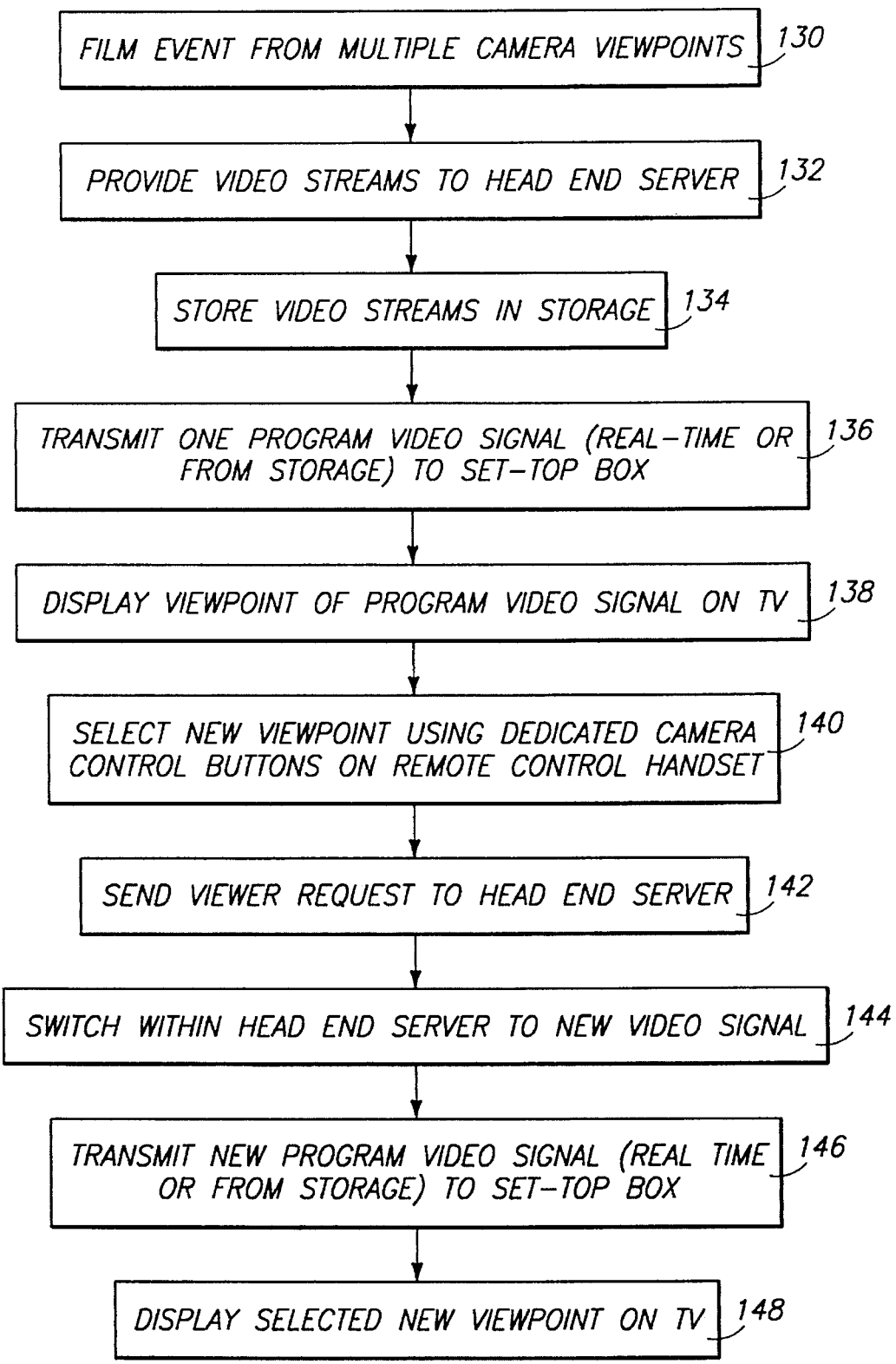

5,600,368

INTERACTIVE TELEVISION SYSTEM AND METHOD FOR VIEWER CONTROL OF MULTIPLE CAMERA VIEWPOINTS IN BROADCAST PROGRAMMING

TECHNICAL FIELD

This invention relates to interactive television, and more particularly, to a system and method for viewer control of multiple camera viewpoints in broadcast programming. This invention further relates to a remote control handset used in the interactive television system.

BACKGROUND OF THE INVENTION

Conventional broadcast programming has traditionally been limited to a single video stream broadcast from the television or cable company to a viewer's television. Although multiple cameras may have been used to cover the event, the program's producer selects which camera to use at which point in the program so that only one video stream is broadcast to the viewer. For example, when broadcasting sporting events, such as baseball games or tennis matches, the sports network typically employs multiple cameras to adequately cover the action. The multiple cameras enable ready replay of key plays, such as a runner sliding into home plate or a diving backhand volley, from many different angles. The producer relies on his or her creativity and experience to timely select the appropriate camera viewpoint which best conveys the sporting event.

The viewer, on the other hand, has no control over what he/she is viewing. Conventional broadcast systems are not interactive and thus, the viewer is forced to watch the single video stream compiled by the program's producer. As a result, the viewer cannot independently choose to watch the action from the home plate camera in anticipation of a close call at home plate.

With the advances made in fiber optics, digital communications, and other broadcast-related technologies, the number of available channels to end viewers is ever increasing. Today, there are approximately 40–70 channels. By the year 2000, the number of channels is expected to reach 500.

As the number of available channels increases, it has become possible to make available multiple camera signals for control by the viewer. In such systems, a channel is reserved for each camera video signal. For example, suppose a musical concert event required three camera viewpoints: one camera facing center stage, a second camera facing at an angle toward the stage, and a third camera portably roving near the stage for close-ups on the musicians. The three cameras would be assigned to channels, say, 150–152. If the viewer wanted to watch a close-up of the lead singer, the viewer changes to channel 152 using the television control panel or a conventional remote control handset having a number keypad and a channel up/channel down key. If the viewer wanted a full view of the stage, the viewer would change to channel 150, and so forth.

This method for viewer interaction is not, however, very convenient for the viewer. The viewer must consciously remember which channels show which camera viewpoints. Three viewpoints for a concert might be manageable. But, six or more viewpoints in a fast paced basketball game or tennis match might leave the viewer frustrated and seemingly behind the action of every play.

The present invention provides an interactive system and method which is intuitive to operate so that the viewer can expertly manipulate the camera viewpoints as desired.

SUMMARY OF THE INVENTION

According to one aspect of this invention, an interactive television system is provided which permits viewer control of multiple camera viewpoints during a television broadcast. The television broadcast is filmed using multiple cameras situated at various camera viewpoints, such as at a sporting event where many different cameras are employed to capture the action from several angles. The television broadcast has a primary channel which the viewer is familiar, and multiple virtual channels associated with the primary channel. These virtual channels carry video signals from the different cameras. The viewer need not be aware of the virtual channels, but simply assumes that he/she has tuned to the primary channel where various camera angles can be manipulated.

The interactive television system includes a set-top box, which is adapted for use with a television, and a remote control handset that is remotely coupled to the set-top box. The set-top box is connected to receive the primary and virtual channels. The remote control handset has dedicated camera control buttons for selecting corresponding virtual channels to thereby permit the viewer to choose a desired camera viewpoint. The dedicated camera control buttons are arranged in a correlating pattern to the camera viewpoints so that selection of a desired viewpoint is intuitive to the viewer. Preferably, the dedicated camera control buttons are arranged according to directional components of a compass. In this arrangement, the viewer simply depresses the "north" button when he/she wishes to view the sporting event from the north side, and so on.

The interactive television system of this invention therefore provides intuitive operation whereby the viewer tunes to a single station, and then expertly manipulates the camera viewpoints as desired using the designated camera control buttons. This arrangement is further advantageous as it permits rapid camera change to keep up with the action. The viewer need not remember which channel carries which viewpoint. Additionally, the viewer is relieved of having to punch various numbers on the keypad or up/down buttons to switch camera angles, which is often times too slow.

BRIEF DESCRIPTION OF THE DRAWINGS

FIG. 2 shows an example camera configuration at a baseball game.

FIG. 3 shows a preferred arrangement of dedicated camera control buttons on a remote control handset according to this invention.

FIG. 7 is a functional block diagram of the remote control handset, set-top box, and head end server according to another aspect of this invention.

FIG. 8 is a flow diagram of preferred steps for controlling multiple camera viewpoints during a television broadcast according to still another aspect of this invention.

DETAILED DESCRIPTION OF THE PREFERRED EMBODIMENTS

Figure 1:
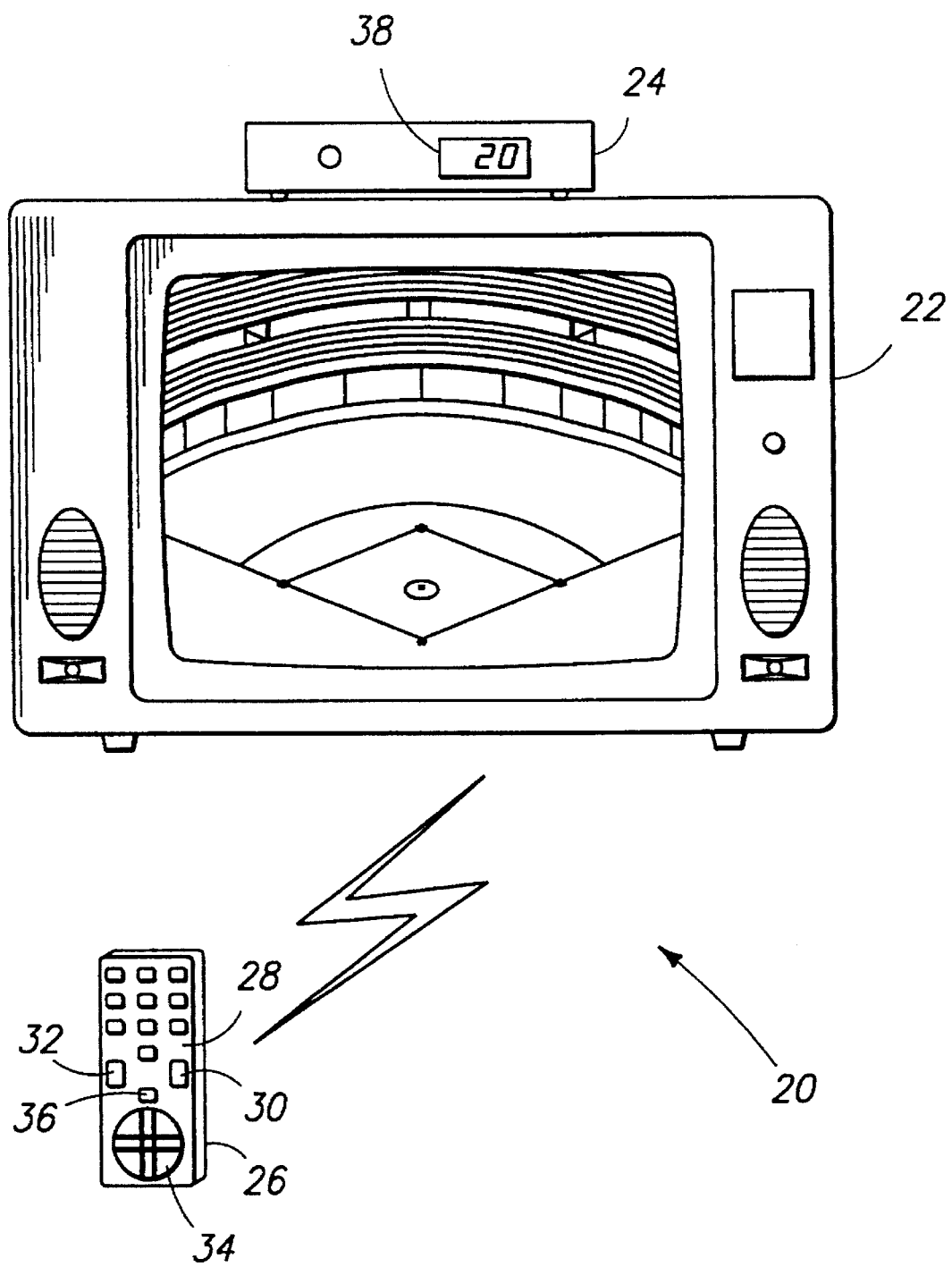
FIG. 1 shows an interactive television system according to one aspect this invention.

FIG. 1 shows an interactive television system 20 according to this invention. The interactive television system 20 includes a television 22, a set-top box 24, and a remote control handset 26. The set-top box 24 is coupled to receive television broadcasts from a cable or television company, and feeds the broadcast signals to the television 22 for display. As is customary, the set-top box controls which broadcast is displayed on the television.

The remote control handset 26 has conventional channel changing buttons in the form of numeric keypad 28 and an up channel/down channel button 30. A volume control button 32 is also shown. Other buttons, such as power and VCR control keys, are not shown, but may also be provided on remote control handset 26. According to one aspect of this invention, remote control handset 26 also has designated camera control buttons 34 and a mode select button 36, which are be described below in more detail.

This invention is particularly concerned with television broadcasts which are filmed using multiple cameras situated at various camera viewpoints. The television broadcast has a primary channel which the viewer is familiar with, and multiple virtual channels associated with the primary channel. A "virtual channel" is an otherwise normal channel that carries a video stream like the primary channel, but the identity of the channel itself is hidden from the viewer. The virtual channels are used to carry video signals from the different cameras. The viewer does not need to be aware of the virtual channels, but instead simply assumes that he/she has tuned to the primary channel where various camera angles can be manipulated.

It would be helpful for purposes of continuing discussion to provide a example entailing a familiar sporting event. Suppose a sports network broadcasts live coverage of a baseball game. The sports network has a primary channel, say channel 20, which the viewer tunes into to watch the baseball game. The viewer tunes to the primary channel using the channel changing buttons 28 or 30. Set-top box 24 includes a channel number display 38 which shows the primary channel number "20".

To adequately cover the baseball game, the sports network positions multiple cameras around a baseball field to provide varied viewpoints. The multiple viewpoints help capture all of the action, as well as provide different replay angles of critical plays, such as a grand slam.

FIG. 2 shows an example camera arrangement around baseball field 40. The action on the baseball field is monitored by seven cameras 42–48. Center field camera 42 captures the action from the center field perspective. Camera 43 provides overhead visuals from a blimp or dome. First base camera 44 monitors action from behind first base as well as a view of the home dugout. Third baseline camera 45 provides a view of the entire field and particularly, down the third baseline. Home plate camera 46 provides a catcher's perspective and shows the types of pitches being hurled at a batter. First baseline camera 47 covers the entire field and down the first baseline. Third base camera 48 observes action from behind third base as well as a view of the visitors' dugout.

The video streams generated by the cameras are carried on separate channels which are simultaneously broadcast to the viewer's home. The program's producer assigns the cameras to corresponding channels in a manner compatible with directional control afforded by the camera control buttons 34 on remote control handset 26. For instance, suppose the program producer assigns a composite signal (i.e., the signal produced and edited by the program staff that is traditionally available on television) to channel 120. The video signals produced by cameras 42–48 are assigned to respective channels 121–127. Channels 120–127 can be referred to as "virtual channels" because the actual identity of channel remains hidden from the viewer who believes that he/she is watching the sports channel "20".

When the viewer first tunes to the primary sports network channel "20", the composite video stream is initially displayed on the television. The composite video stream is created by the program's producer and staff from the multiple camera viewpoints. It presents the baseball game in the same manner available in conventional television systems, including: data overlays for scores or statistics, audio from the commentators, and cuts to various camera angles to timely capture the action.

If the viewer wishes to choose another camera viewpoint independently from what the program producer is displaying, the viewer simply pushes one of the dedicated camera control buttons 34 on the remote control handset 26. The camera control buttons are arranged in a correlating pattern to the camera viewpoints. One preferred arrangement is a directional layout along compass coordinates as shown in FIG. 3. Here, camera control buttons 34 include a "northwest" oriented button 50, a "north" oriented button 51, a "northeast" oriented button 52, an "east" oriented button 53, a "southeast" oriented button 54, a "south" oriented button 55, a "southwest" oriented button 56, and a "west" oriented button 57.

The camera control buttons 34 correlate to the camera viewpoints at the baseball field 40 in an intuitive fashion. For example, the "north" button 51 can be assigned to select the viewpoint from center field camera 42 situated at the north end of the ballpark. The "south" button 55 can be assigned to select the viewpoint from home plate camera 46 situated at the south end of the baseball field. The following table 1 summarizes the correlation between the camera control buttons and the camera positions about the baseball field 40, as well as the corresponding channel carrying the video stream.

TABLE 1

| Direction | Button | Camera (Number and Viewpoint) | Channel |
| --- | --- | --- | --- |
| NW | 50 | Composite — edited by producer from all cameras | 120 |
| N | 51 | 42 — Center Field | 121 |
| NE | 52 | 43 — Blimp | 122 |
| E | 53 | 44 — 1st Base | 123 |
| SE | 54 | 45 — 3rd Baseline | 124 |
| S | 55 | 46 — Home Plate | 125 |
| SW | 56 | 47 — 1st Baseline | 126 |
| W | 57 | 48 — 3rd Base | 127 |

As evident from table 1, the dedicated camera control buttons offer the viewer intuitive, intelligent control of the various camera viewpoints. If the viewer wants to watch the pitch, the viewer simply hits the "south" button 55 to watch from the home plate viewpoint taken through camera 46. If the viewer wants to see whether a hit ball slices foul down the first baseline, the viewer can immediately press the "southwest" button 56 to observe the 1st baseline taken through camera 47. In a very short time, the viewer learns to instinctively switch to the desired camera viewpoint without conscious effort because of the intuitive correlation between the camera control buttons and camera viewpoints.

Although the composite signal is described as being carried on a virtual channel 120, it may alternatively be carried on the primary channel "20". In this manner, the primary channel carries the traditional composite signal created by the program's producer, while the independent camera viewpoints are carried on the virtual channels. The broadcast or cable company would provide as part of the broadcast video signal appropriate information which coordinates the composite signals and independent camera viewpoints as belonging to the same broadcast program.

Figure 4:
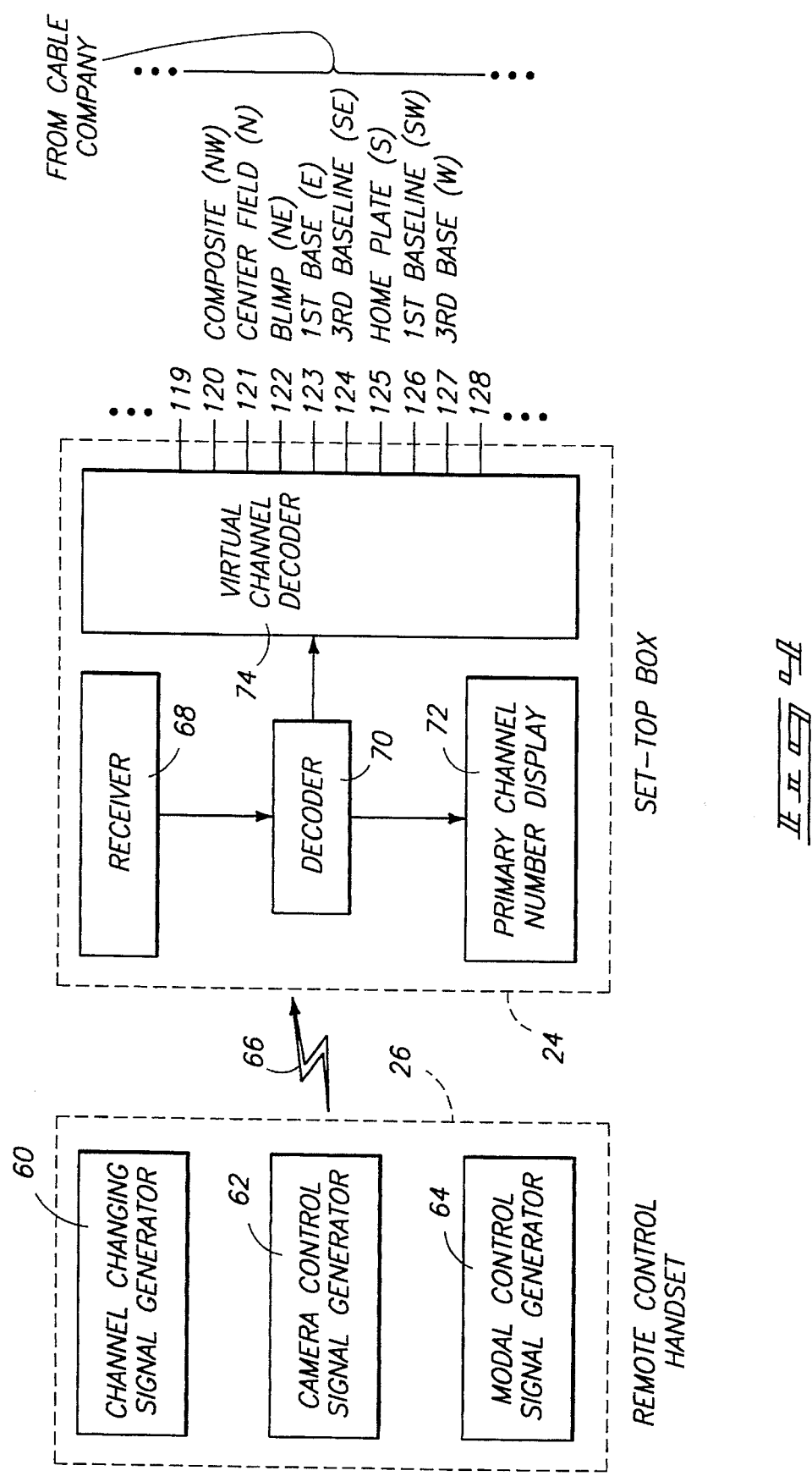
FIG. 4 is a functional block diagram of the remote control handset and set-top box of this invention.

FIG. 4 shows a functional block diagram of the remote control handset 26 and set-top box 24. Remote control handset 26 comprises a channel changing signal generator 60 which generates channel changing signals in response to depression of the channel changing buttons 28 and 30. Remote control handset 26 further comprises a camera control signal generator 62 which generates unique camera control signals in response to depression of the camera control buttons 34. A modal control signal generator 64 is also provided to generate a modal control signal in response to actuation by modal select button 36, which is described below in more detail.

The signals generated in the remote control handset are transmitted via conventional infrared or radio communication techniques (as indicated by jagged arrow 66) to a receiver 68 in set-top box 24. Decoder 70 deciphers the transmitted signal. If the transmitted signal involves channel changing information, the set-top box changes the primary channel and the number of the primary channel is displayed on the primary channel number display 72. If the transmitted signal involves volume control or other television operating settings, the decoder 70 informs the appropriate control circuits (not shown) to adjust the television as desired.

If the transmitted signal is a camera control signal, it is forwarded to virtual channel selector 74 which is connected to all of the channels coming from the cable company. In our continuing example, FIG. 4 shows virtual channels 120–127 which carry the video streams from the cameras at the baseball game. Virtual channel selector 74 switches among the virtual channels in response to the selected camera control buttons depressed by the viewer.

Suppose, for example, the viewer wants to watch the lead off runner on first base. The viewer might depress the "west" button 57 to watch from the third base camera 48. The depressed "west" button causes generation of a unique camera control signal which is transmitted to set-top box 24. The camera control signal is received and decoded and ultimately passed onto virtual channel selector 74. In response to the signal, the virtual channel selector switches from the present camera angle to virtual channel 127 which is carrying the video stream from third base camera 48.

It is noted that the virtual channel selector 74 changes the virtual channel without affecting the primary channel number "20" being shown on the primary channel number display 72. In this manner, the change of camera viewpoints is transparent to the viewer. The viewer believes that he/she is still watching the sports network on channel "20", even though the set-top box is switching among multiple channels all the time. The intuitive, transparent control of camera viewpoints afforded by this invention is advantageous because the viewer does not have to expressly change channels or memorize the various channels which carry the different camera viewpoints.

Figure 5:
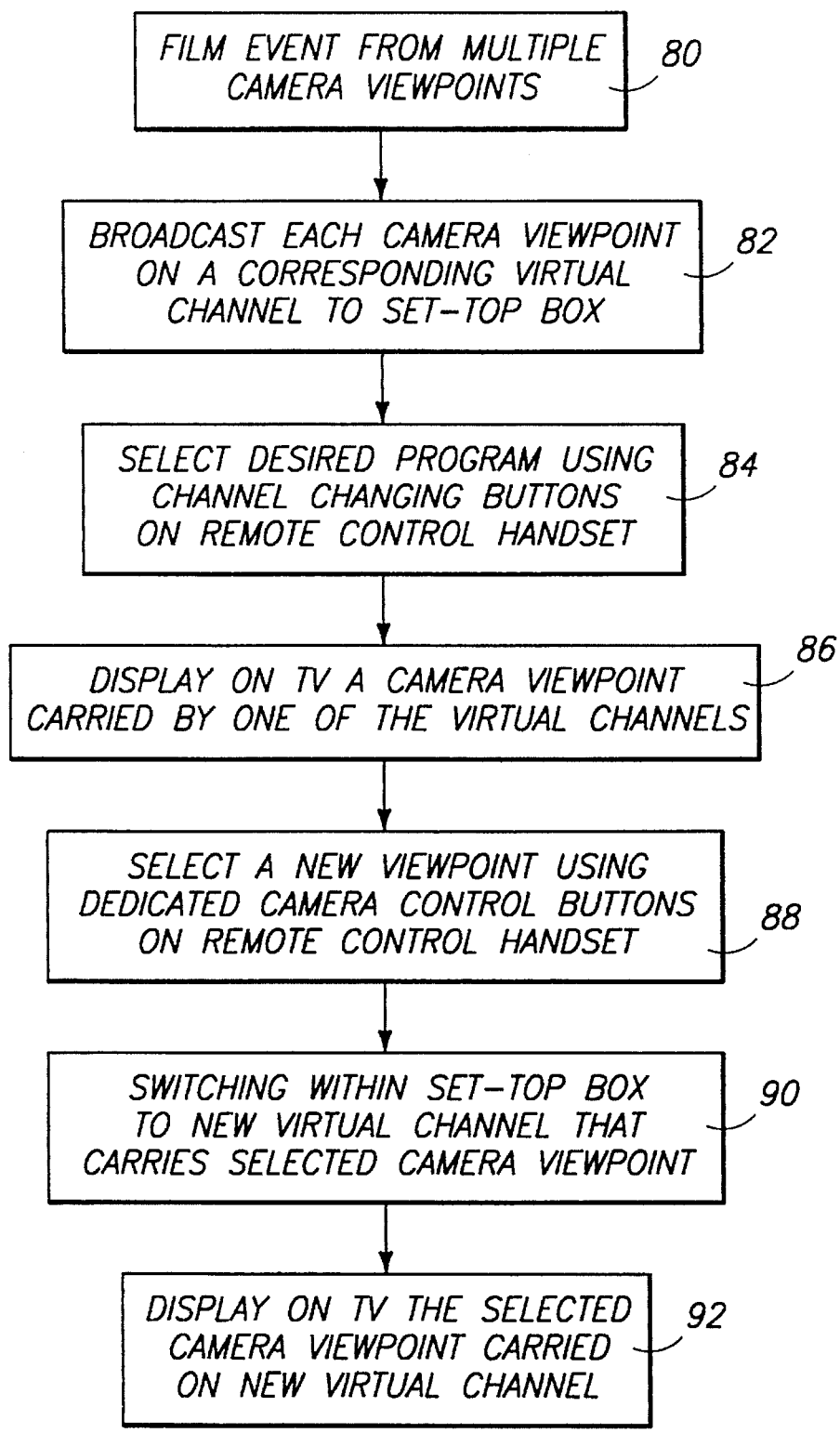
FIG. 5 is a flow diagram of preferred steps for controlling multiple camera viewpoints during a television broadcast according to one aspect of this invention.

FIG. 5 shows preferred steps in a method for controlling multiple camera viewpoints during a television broadcast according to the techniques of this invention. Steps 80 and 82 establish the environment for one preferred use of this invention. At step 80, a televised event is covered using multiple camera viewpoints, such as the above example baseball game. The video stream from each camera is broadcast on a separate channel to the viewer's set-top box (step 82).

At step 84, the viewer selects a desired program, such as the baseball game, using the channel changing buttons 28 or 30 on the remote control handset 26. At this point, the composite video signal on channel 120 is displayed on the television (step 86), although other virtual channels might alternatively be used as the default viewpoint. When the viewer wishes to change to a new camera viewpoint, the user presses the appropriate dedicated camera control button 34 on the remote control handset 26 (step 88). This effectuates generation of a unique camera control signal which is sent to the set-top box 24, or more precisely, to the virtual channel selector 74 which switches to the virtual channel that carries the selected camera viewpoint (step 90). As a result, the video stream from the new virtual channel is displayed on the television (step 92).

Although the interactive television system of this invention allows viewers to control the camera viewpoints, the producer might still be inclined to present simulcast information on any or all of the channels. Score overlays, statistics, and commentator audio can be made available to the viewers regardless of which camera viewpoint is selected.

It is noted that an alternative configuration of the interactive television system can allow the viewer to customize the program to his/her tastes. For example, the simulcast information might be provided on an entirely separate channel which can then be manipulated and combined with the selected camera viewpoints in the set-top box according to the viewer's preferences.

Figure 6:
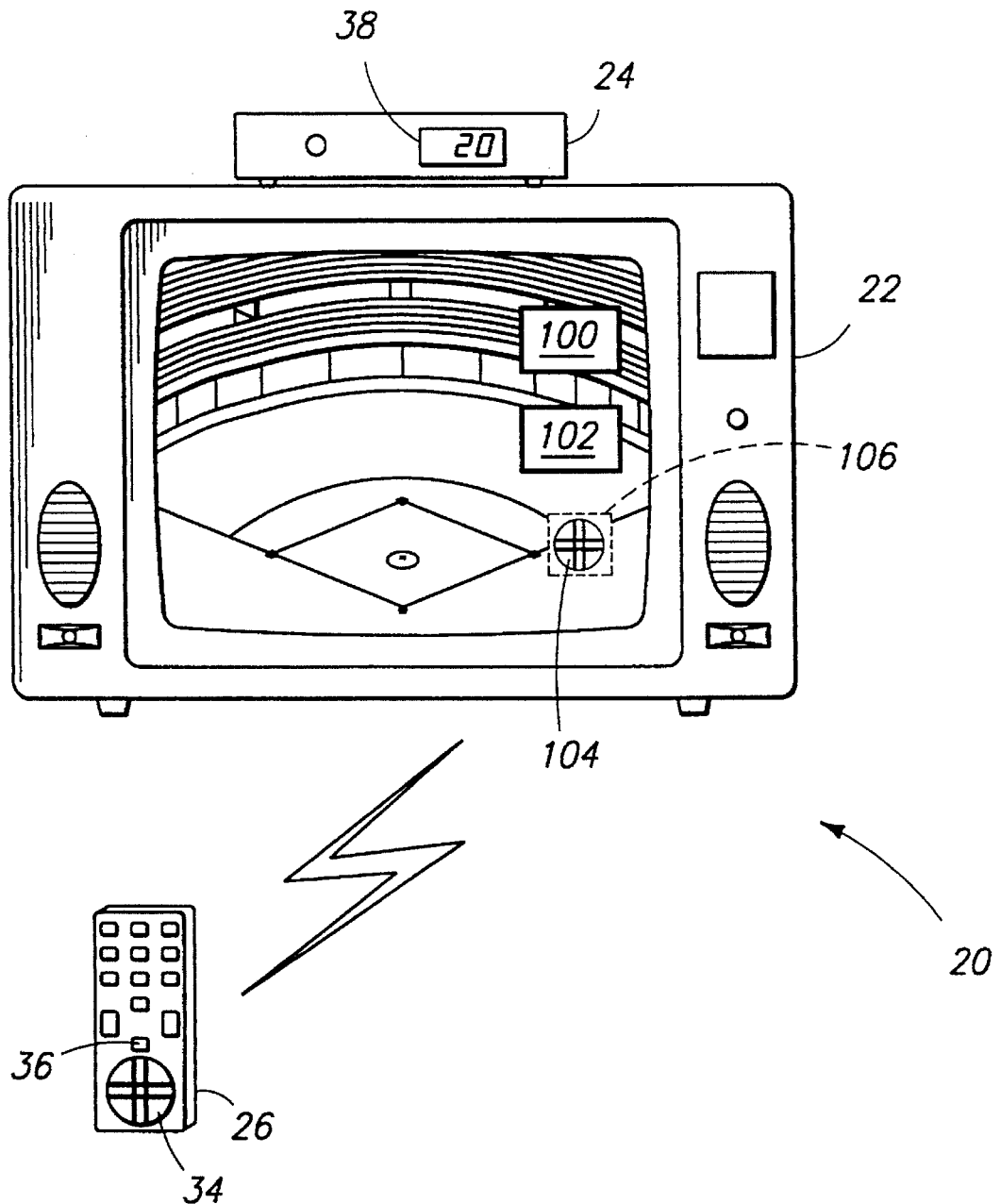
FIG. 6 shows an interactive television system according to another aspect of this invention.

FIG. 6 shows another aspect of interactive television system 20 according to this invention. Here, television 22 is shown displaying the selected virtual channel (i.e., an overhead view of the baseball game taken from the blimp camera 43), two selectable option icons 100 and 102, and a modal selection icon 104. The option icons 100 and 102 represent alternative viewing screens which display information other than video footage of the baseball game. For example, the screen associated with option icon 100 might provide the statistics of a player or entire team and the screen associated with option icon 102 might provide the league standings. Many other options may also be included, such as the scores of other games, the remaining schedule, or up-to-the-minute baseball news.

The modal select button 36 on remote control handset 26 enables the interactive television system to toggle between two modes of operation. In a first mode of operation, the dedicated camera control buttons 34 are used to cycle through the various option icons 100 and 102 and modal selection icon 104. A highlighting indicator 106 is used to visually identify the active option icon.

Once the modal selection icon 104 is highlighted, the viewer can hit the modal select button 36 to toggle to the other mode of operation. In the second mode of operation, the camera control buttons 34 are used to switch among the virtual channels, in the manner described above.

FIG. 7 shows a functional block diagram of the remote control handset 26, set-top box 24', and a head end server 120 according to another implementation of this invention. The construction and operation of remote control handset 26 and set-top box 24' are essentially the same as that described above with respect to FIG. 4. The only notable difference is that the set-top box 24' is implemented without a virtual channel decoder, and instead sends the camera control signals over cable 122 to head end server 120.

Head end server 120 services many (e.g., tens to hundreds of thousands) viewers. Head end server 120 includes a program selector 124, a camera viewpoint selector 126, and a program store 128. The program selector 124 chooses the appropriate program (such as the baseball game), and the camera viewpoint selector 126 chooses the desired camera viewpoint (such as the home plate camera). The head end server 120 receives the multiple camera video signals directly from a satellite feed, or other source. The head end server can then immediately rebroadcast the program to the set-top box 24', as is the case for televising live baseball action. If the viewer desires to change the camera viewpoint, he/she depresses the desired dedicated camera control button to generate an appropriate camera control signal within remote control handset 26. The camera control signal is transmitted via communication link 66 to set-top box 24', which then sends the request to head end server 120. Program selector 124 and camera viewpoint selector 126 decode the signal and cause the appropriate video signal corresponding to the selected camera viewpoint to be sent back to the set-top box for display on the television.

Alternatively, the head end server 120 can digitally store the program received via satellite in program store 128. Here, all video streams from all cameras used to film a specific program are digitally stored in program store 128. In this interactive environment, the viewer can call up for viewing a stored program that has already been run. For example, the viewer may wish to watch a baseball game that aired live last week. The head end server 120 retrieves the desired video signals from the program store. When the viewer wants to change viewpoints, the program selector and camera viewpoint selector change the memory pointers to the appropriate storage locations to retrieve the selected camera video signal.

FIG. 8 shows preferred steps in a method for controlling multiple camera viewpoints using the FIG. 7 interactive television system. At step 130, a televised event is covered using multiple camera viewpoints, such as the above example baseball game. At step 132, the video streams are provided to head end server 120, for example, via satellite. At step 134, the video streams of all the different camera viewpoints can be stored in program store 128. The head end server transmits one of the video signals (e.g., the composite video signal) in real-time, or by reading it from program store 128, to set-top box 24' (step 136).

The camera viewpoint corresponding to the transmitted video signal is displayed on the television (step 138). The user changes the camera viewpoint by intuitively depressing a particular dedicated camera control button on the remote control handset (step 140). This request is sent back through the set-top box 24' to head end server 120 (step 142), which then switches to the video signal corresponding to the selected camera viewpoint (step 144). The new video signal is then transmitted over cable 122 to set-top box 24' (step 146) for display on the television (step 148).

The interactive television system of this invention provides intuitive and intelligent operation. The viewer simply tunes to a single station, and then manipulates the camera viewpoints as desired using the designated camera control buttons. The inconvenience of having to remember which channel carries which viewpoint is eliminated. Additionally, the intuitive system permits rapid camera change to keep up with the action. The viewer is relieved of having to punch various numbers on the keypad or up/down buttons to switch camera angles, which is often too slow for the pace of the event.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A system comprising:

a display unit to receive a broadcast program which is filmed using multiple cameras situated at various camera viewpoints, the broadcast program having a primary channel and multiple virtual channels associated with the primary channel, the virtual channels carrying video signals from corresponding cameras;

a remote control handset remotely coupled to the display unit, the remote control handset having dedicated camera control buttons for selecting corresponding virtual channels to thereby choose a desired camera viewpoint; and the dedicated camera control buttons being arranged in a correlating pattern to the camera viewpoints to directly map the camera control buttons on the remote control handset to the camera viewpoints so that a viewer can choose a desired camera viewpoint using intuitive control of the camera control buttons without diverting the viewer's eyes from the display unit.

2. A system according to claim 1 wherein the dedicated camera control buttons are arranged according to directional components of a compass.

3. A system according to claim 1 wherein the display unit includes:

a channel number display that shows a number of the primary channel; and a virtual channel selector to switch among the virtual channels selected by the dedicated camera control buttons on the remote control handset without changing the primary channel number shown on the channel number display.

4. A system according to claim 1 further comprising a head end server connected to the display unit, the remote control handset generating unique camera control signals indicative of and corresponding to the multiple camera viewpoints and transmitting them to the display unit, the display unit sending the camera control signal to the head end server, the head end server switching among the virtual channels selected by the dedicated camera control buttons on the remote control handset.

5. A system according to claim 4 wherein the head end server stores the video signals from corresponding cameras.

6. An interactive television system comprising:

a television;

a set-top box operatively connected to the television, the set-top box being connected to receive a television broadcast which is filmed using multiple cameras situated at various camera viewpoints, the television broadcast having a primary channel and multiple virtual channels associated with the primary channel, the virtual channels carrying video signals from corresponding cameras;

a remote control handset remotely coupled to the set-top box, the remote control handset having dedicated camera control buttons for selecting corresponding virtual channels to thereby choose a desired camera viewpoint, the dedicated camera control buttons being arranged in a correlating pattern to the camera viewpoints to directly map the camera control buttons on the remote control handset to the camera viewpoints so that a viewer can choose a desired camera viewpoint using intuitive control of the camera control buttons without diverting the viewer's eyes from the display unit;

the television displaying the virtual channel selected by the remote control handset, the television further displaying at least one selectable option icon, a modal selection icon, and a highlighting indicator which highlights one of the option icon or modal selection icon for visual identification;

the remote control handset further having a mode select button which allows toggle between first and second modes of operation when the modal selection icon on the television is highlighted;

in the first mode of operation, the camera control buttons are used to cycle between the option icon and the modal selection icon; and in the second mode of operation, the camera control buttons are used to switch among the virtual channels.

7. An interactive television system according to claim 6 wherein the dedicated camera control buttons are arranged according to directional components of a compass.

8. A remote control handset for use in controlling a display unit, the display unit being connected to receive a broadcast program which is filmed using multiple cameras situated at various camera viewpoints, the broadcast program having a primary channel and multiple virtual channels associated with the primary channel, the virtual channels carrying video signals from corresponding cameras; the remote control handset comprising:

multiple dedicated camera control buttons for selecting corresponding virtual channels to thereby choose a desired camera viewpoint, the dedicated camera control buttons being arranged in a correlating pattern to the camera viewpoints to directly map the camera control buttons on the remote control handset to the camera viewpoints so that a viewer can choose a desired camera viewpoint using intuitive control of the camera control buttons without diverting the viewer's eyes from the display unit.

9. A remote control handset according to claim 8 wherein the dedicated camera control buttons are arranged according to directional components of a compass.

10. A method for controlling multiple camera viewpoints during a broadcast program, the television program having a primary channel and multiple virtual channels associated with the primary channel, the virtual channels carrying video signals from corresponding cameras, comprising the following steps:

correlating the camera viewpoints to corresponding camera control buttons on a remote control handset in art intuitive relationship, the camera control buttons being arranged in a correlating pattern to the camera viewpoints to directly map the camera control buttons on the remote control handset to the camera viewpoints so that a viewer can chose a desired camera viewpoint using intuitive control of the camera control buttons without diverting the viewer's eyes from the broadcast program;

displaying a first camera viewpoint corresponding to a first virtual channel;

switching, in response to actuation of a particular camera control button on the remote control handset, from the first virtual channel to a second virtual channel which corresponds to a second camera viewpoint; and displaying the second camera viewpoint corresponding to the second virtual channel.

11. A method according to claim 10 further comprising the following additional steps:

generating channel changing signals within the remote control handset in response to activation of a channel button on the remote control handset;

generating camera control signals within the remote control handset in response to activation of the camera control buttons;

selecting the primary channel using a channel changing signal; and maintaining the primary channel while using the camera control signals to switch among the virtual channels so that use of multiple channels is transparent to an end user.

12. A method according to claim 10 further comprising the following additional steps:

displaying at least one selectable option icon and a modal selection icon;

cycling between the option icon and the modal selection icon in a first mode of operation in response to actuation of the camera control buttons on the remote control handset;

choosing the modal selection icon to switch from the first mode of operation to a second mode of operation; and switching among the virtual channels in the second mode of operation in response to actuation of the camera control buttons on the remote control handset.

13. In a video broadcast system, a method for controlling multiple camera viewpoints during a broadcast program, the video broadcast system having a display unit and a remote control handset at a viewer residence and a video content provider remote to the viewer residence to serve the broadcast program to the display unit, the broadcast program being filmed using multiple cameras situated at various camera viewpoints, the method comprising the following steps:

correlating the camera viewpoints to corresponding camera control buttons on the remote control handset in an intuitive relationship, the camera control buttons being arranged in a correlating pattern to the camera viewpoints to directly map the camera control buttons on the remote control handset to the camera viewpoints so that a viewer can choose a desired camera viewpoint using intuitive control of the camera control buttons without diverting the viewer's eyes from the display unit;

transmitting the camera viewpoints from the video content provider to the display unit on a primary channel and multiple virtual channels associated with the primary channel;

displaying on the display unit a first camera viewpoint corresponding to a first virtual channel;

generating, in response to actuation of a particular camera control button on the remote control handset, a camera control signal within the remote control handset, the camera control signal being indicative of and corresponding to a second camera viewpoint;

sending the camera control signal from the remote control handset to the display unit;

switching, in response to the camera control signal, from the first virtual channel to the second virtual channel; and displaying on the display unit the second camera viewpoint corresponding to the second virtual channel.

14. A system according to claim 1 wherein the display unit comprises a set-top box and a television.

* * * * *